United States Patent
Shah et al.

[11] Patent Number: 5,200,086
[45] Date of Patent: Apr. 6, 1993

[54] EMULSION DESTABILIZATION AND TREATMENT

[75] Inventors: Jitendra T. Shah, Naperville; Thomas M. Miller, Aurora; John H. Collins, Bloomingdale, all of Ill.

[73] Assignee: Nalco Chemical Company, Naperville, Ill.

[21] Appl. No.: 747,776

[22] Filed: Aug. 20, 1991

[51] Int. Cl.$^5$ .............................................. C02F 1/56
[52] U.S. Cl. ................................... 210/708; 210/709; 210/710; 210/727; 210/734; 210/736; 210/745; 210/746; 210/778; 252/358
[58] Field of Search ............... 210/708, 709, 710, 725, 210/727, 728, 734–737, 745, 746, 778; 252/358

[56] References Cited

U.S. PATENT DOCUMENTS

| | | | |
|---|---|---|---|
| 3,446,731 | 5/1969 | Harsh | 210/708 |
| 3,956,117 | 5/1976 | Beadley et al. | 210/708 |
| 4,415,467 | 11/1983 | Piepho | 210/725 |
| 4,588,508 | 5/1986 | Allenson et al. | 210/708 |
| 4,789,483 | 12/1988 | Spei et al. | 210/745 |
| 4,855,061 | 8/1989 | Martin | 210/745 |
| 5,045,212 | 9/1991 | Augustin et al. | 210/727 |

FOREIGN PATENT DOCUMENTS 53-99658  8/1978  Japan .................................. 210/708

*Primary Examiner*—Peter Hruskoci
*Attorney, Agent, or Firm*—Robert A. Miller; Joseph B. Barrett; James J. Drake

[57] ABSTRACT

A method for treating and resolving a phosphorus containing oily waste emulsion is described. The treatment uses an emulsion destabilizing cationic polymer of low molecular weight in combination with filter aids to form a coacervate slurry. The coacervate slurry can be optionally treated with either high molecular weight anionic or cationic coagulents, or combination thereof. The suspended solids formed by the above treatments are removed from the slurries and wasted or discarded or incinerated. The remaining liquids may be recycled, reused, or treated as effluent meeting environmental standards.

18 Claims, 6 Drawing Sheets

EMULSION TREATMENT PROCESS

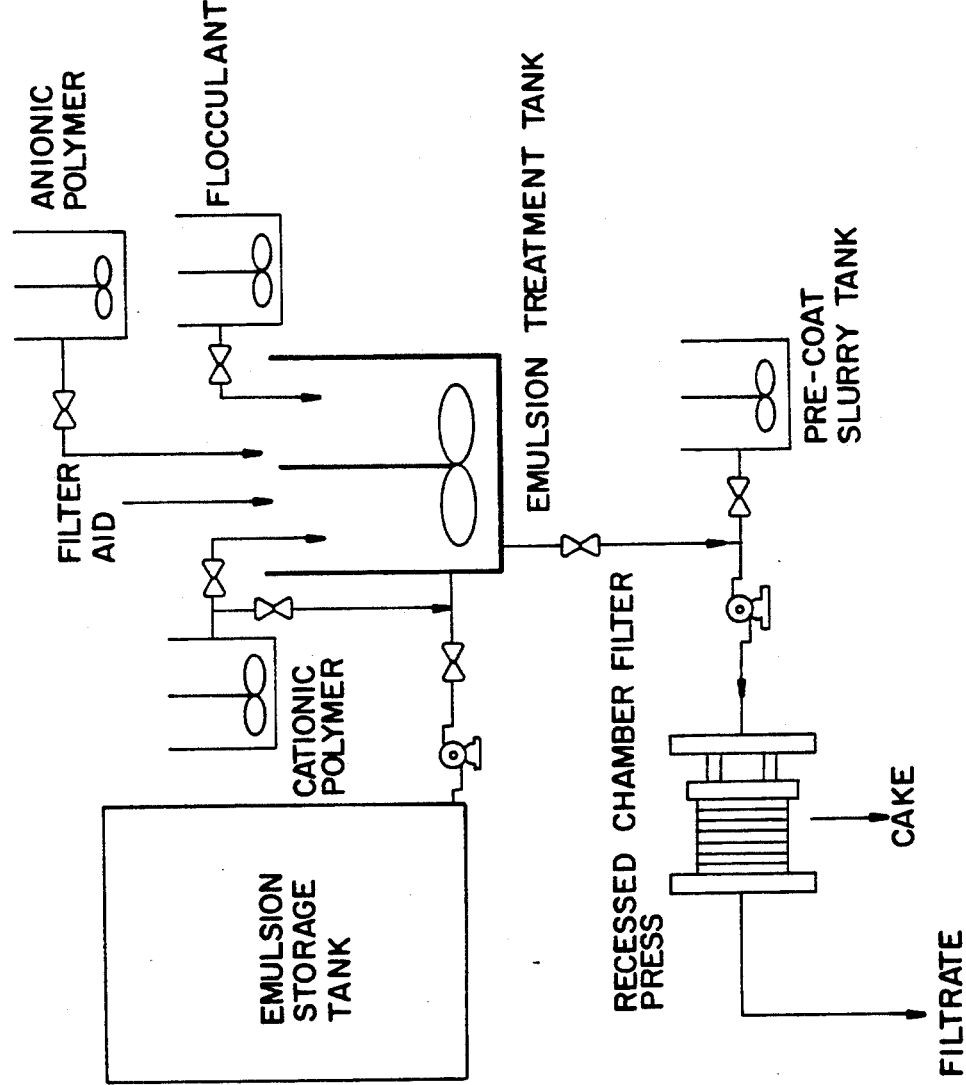

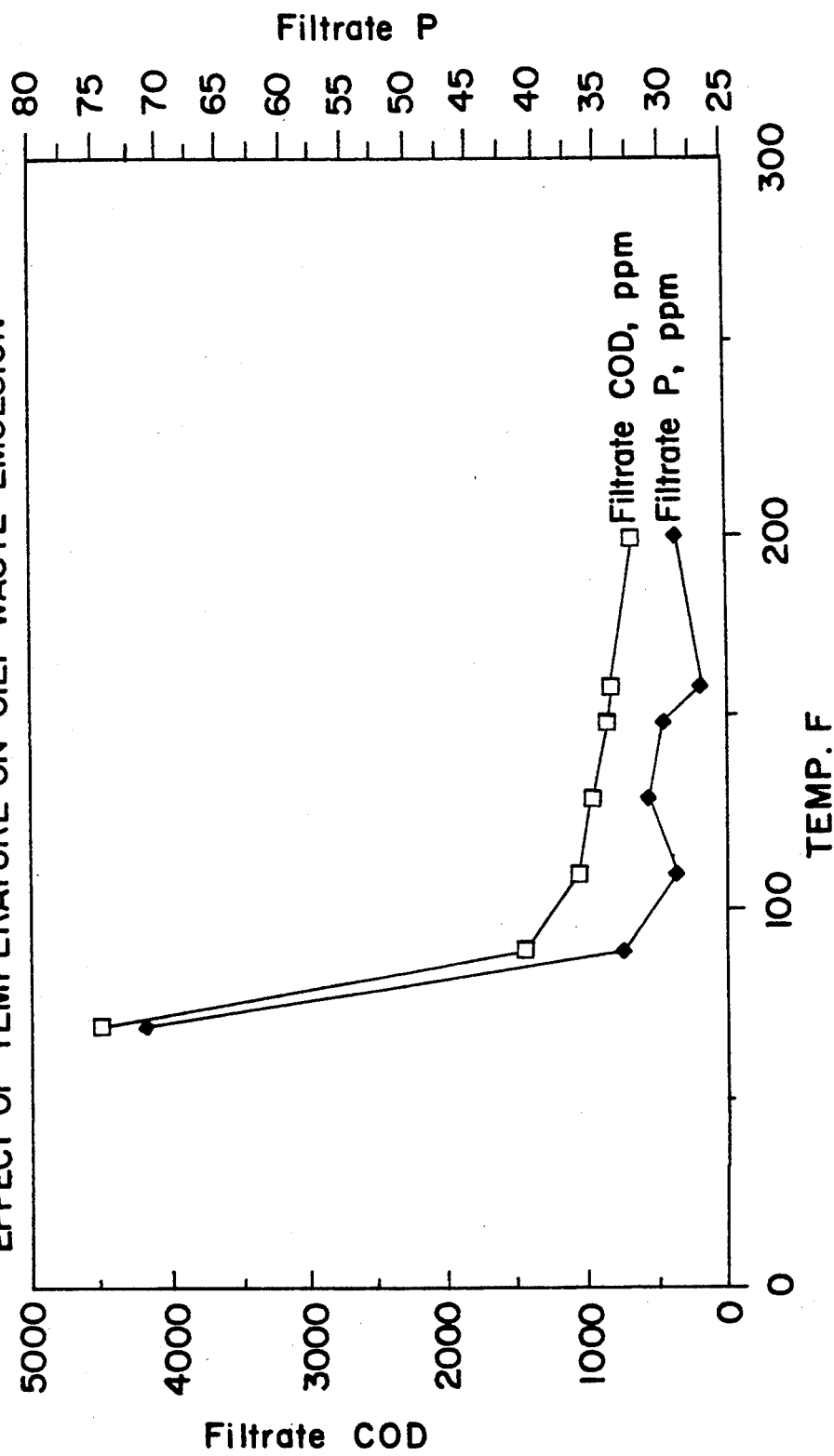

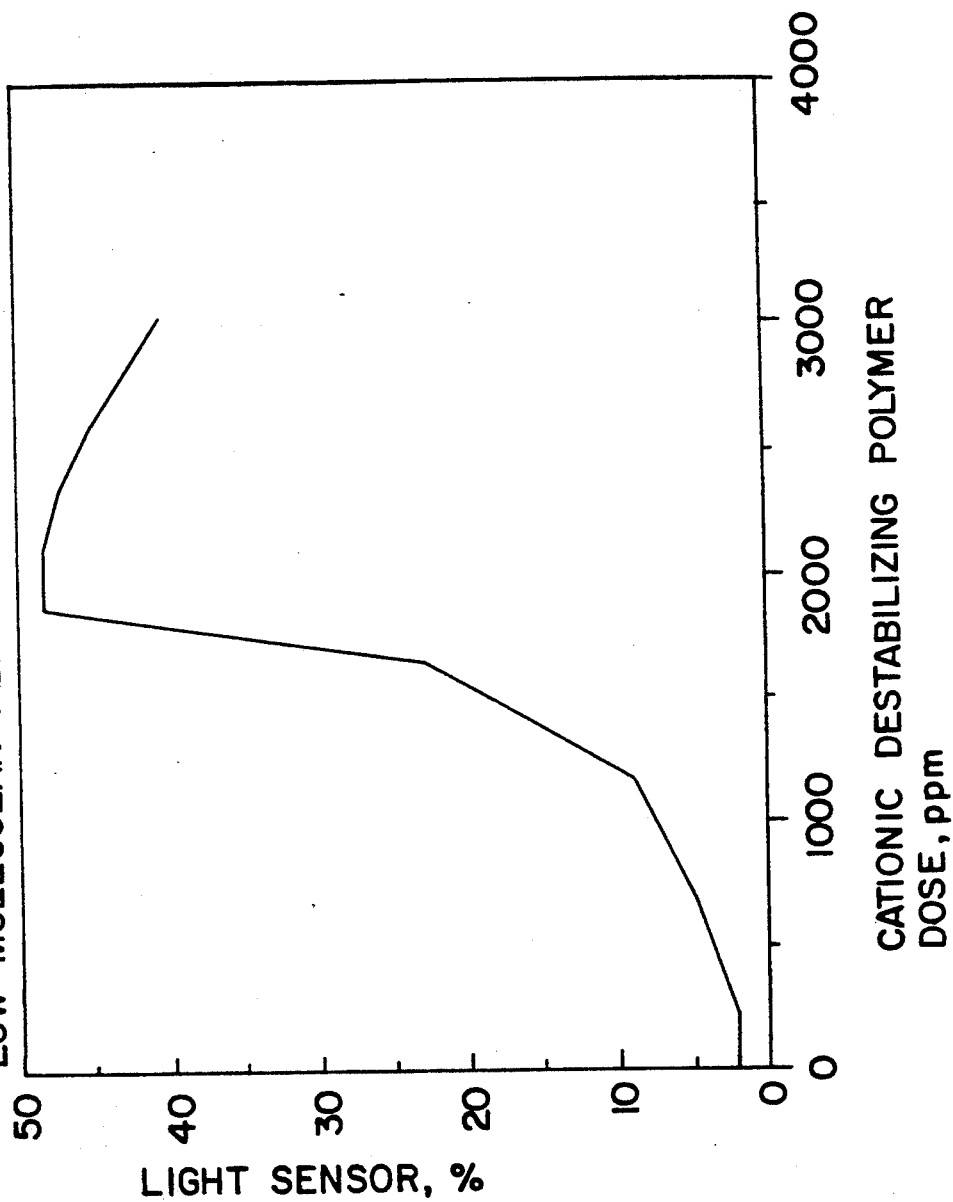

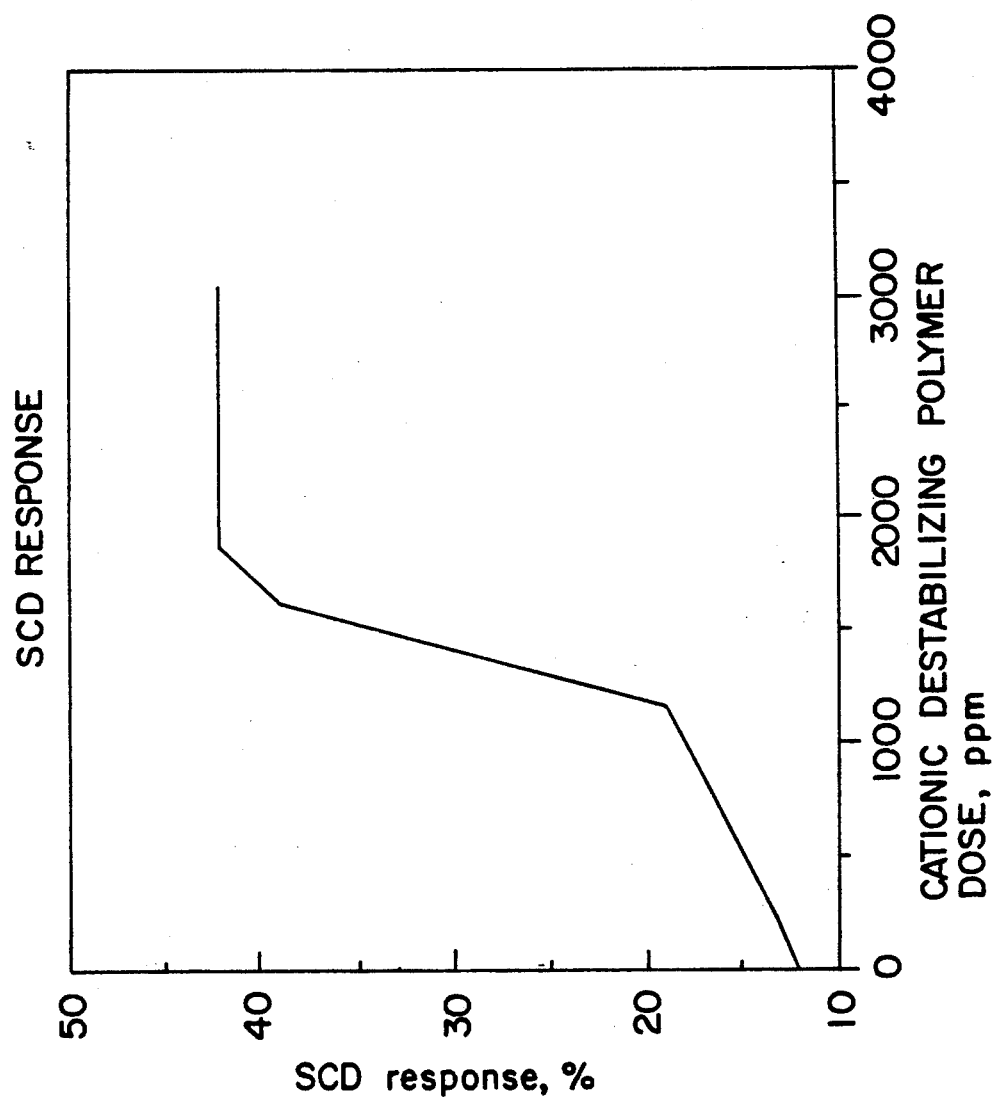

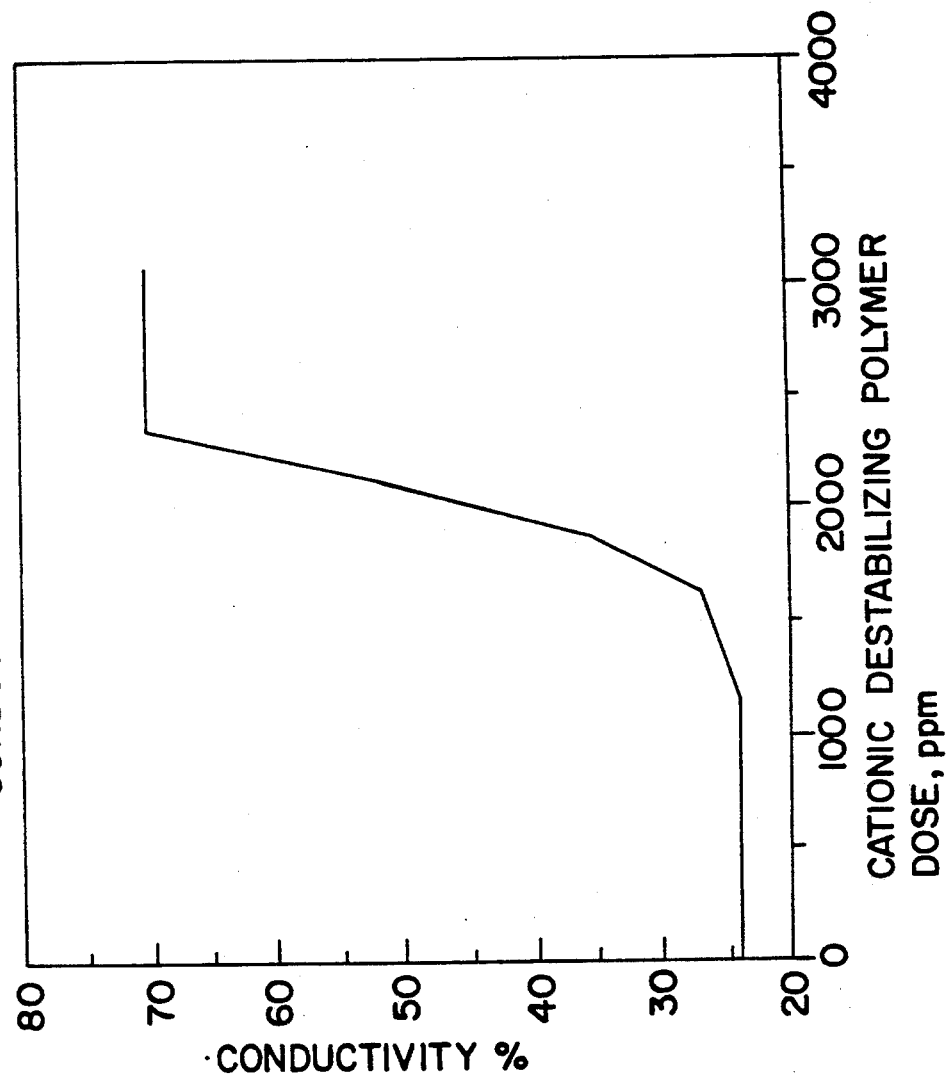

EMULSION DESTABILIZATION AND TREATMENT

INTRODUCTION

Dacron ® fibers are fibers produced from polyesters formed from terephthalic acid and ethylene glycol. The finishing of Dacron ® fibers involves the use of various organic materials, emulsifiers, and the like, the purpose of which is to provide to the fiber a coating which assists in the later processing, weaving, appearance, feel, and the like, of the fiber.

Normally these emulsifiers, surface active agents, fiber coatings, and other finishing chemicals are applied either in dilute solutions or emulsions in aqueous media and after application, the fibers may be washed with aqueous washing solutions. The use of these water based formulas, emulsions, or washing solutions creates an aqueous waste stream, which waste stream can be very difficult to treat from the point of view of removal of residual organic treating agents.

This waste stream is particularly difficult to treat when the Dacron ® fibers have been treated with organic phosphate esters, a process used around the world by a major manufacturer Dacron ® fibers and Dacron ® fabrics.

[1] Dacron ® is a registered trademark of the E. I. DuPont de Nemours Company

When these emulsions or oily waste phosphorous containing emulsions are obtained from a process of finishing these polyester fibers, these waste emulsions have in the past not been successfully treated by any known emulsion breaking and/or destabilization techniques.

The waste emulsions are primarily characterized by the presence of organic phosphorous compounds, particularly fatty acid esters of phosphoric acid. These fatty acid esters have the formula represented below:

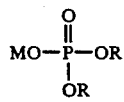

In the above formula, R is individually chosen from hydrocarbon radicals having from 6 to about 24 carbon atoms, preferably from about 8 to about 18 carbon atoms and most preferably from about 10 to about 14 carbon atoms. These hydrocarbon groups can be linear or branched alkyl groups, aryl groups, alkaryl groups, aralkyl groups, cyclic groups or mixtures thereof. Preferably, they are linear and/or branched alkyl groups.

Also, in the above formula, M represents hydrogen, sodium, potassium, ammonium cation, and mixtures thereof. M can also represent, under certain circumstances, multivalent cations such as magnesium, calcium, and the like.

The oily waste phosphorous containing emulsions may contain other organic and/or inorganic materials, such other materials for example, including hydrocarbon oils, surfactants and lubricants, polyester fiber dusts, calcium and magnesium hardness, either as the hydroxides or carbonates, and the like.

As earlier stated, these waste oily phosphorous containing emulsions are collected after use in finishing polyester fibers and present a most difficult treatment problem. The emulsions have been so difficult to destabilize and treat, they have simply been collected, trucked away, and landfilled at a horrendous cost.

OBJECTS OF THE INVENTION

It is therefore an object of this invention to successfully treat oily waste phosphorous containing emulsions obtained from processes of finishing polyester fibers so as to collect the phosphorous containing wastes in a form that can be easily disposed of without high cost or environmental impact.

It is also an object of this invention to obtain a clarified water phase which may either be recirculated or safely discharged into the environment, with or without additional treatment.

It is another object of this invention to provide for a treating process for these oily waste phosphorous containing emulsions which process involves the use of an effective emulsion destabilizing amount of low molecular weight cationic polymers and the use of coacervating amounts of finely divided water insoluble filter aids so as to form a coacervate slurry in water which coacervate slurry may easily be separated into its components to provide for recovery of the waste fractions of the oily waste phosphorous materials and a clarified, environmentally acceptable water phase, either directly or after continued treatment through usual waste water treatment facilities.

It is further an object of the invention to provide for clarification of oily waste phosphorous containing emulsions, separation of waste oily phosphorous containing fractions of these waste emulsions, and the safe incineration of these oily waste phosphorous containing fractions. Other objects of this invention shall be presented in the description of the invention.

BRIEF DESCRIPTION OF THE DRAWINGS

FIG. 2 is a process line diagram providing for one option of a process used to treat pilot plant quantities of the waste emulsion.

FIG. 3 shows the effect of temperature on the operations of this invention.

FIG. 4 shows the control of the amount of emulsion destabilizing cationic polymer via light scattering measurements FIG. 5 shows the control of the amount of emulsion destabilizing cationic polymer via a streaming current electrode detector.

FIG. 6 shows the control of the amount of emulsion destabilizing cationic polymer via conductivity measurement.

THE INVENTION

Figure 1:
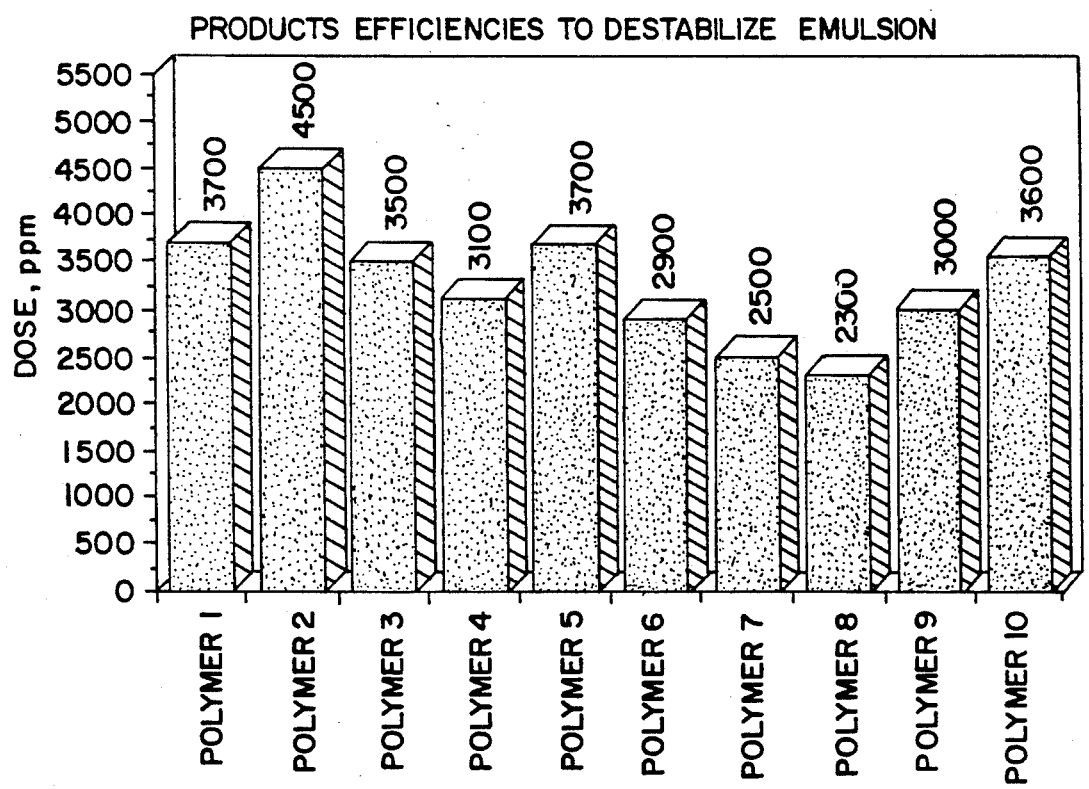
FIG. 1 provides a bar chart representation of effective dosages of various low molecular weight cationic polymers needed to break or destabilize the phosphorous containing oily waste emulsions derived from polyester fiber finishing operations.

We have discovered a treatment process for treating oily, phosphorous containing, waste emulsions which waste emulsions are obtained from processes designed to provide finishing surfaces to polyester fibers, the treatment process comprising collecting the oily, phosphorous containing, waste emulsions, and treating said oily phosphorous containing waste emulsions with an effective emulsion destabilizing cationic polymer having a weight average molecular weight ranging from about 1000 to about 500,000, preferably from 2000 to about 150,000, thereby forming a destabilized emulsion.

The aforementioned destabilized oily phosphorous containing waste emulsions is treated with an effective coacervating amount of a finely divided water insoluble filter aid, thereby forming a coacervate slurry in water and then removing said coacervate slurry from water, thereby recovering a coacervate solid and a clarified water phase.

In the above process, cationic polymer which is useful is chosen from the group consisting of but not limited to either vinylic cationic polymers or condensation cationic polymers.

The preferred polymer is a polymer which contains the monomer diallyl dimethyl ammonium chloride, (hereafter DADMAC) or equivalent salts thereof. This DADMAC containing polymer preferably ranges in average molecular weight between about 50,000 and about 150,000 and contains at least 50 mole percent of the DADMAC monomer, preferably at least 80 mole percent DADMAC, and most preferably the polymer is a homopolymer of DADMAC.

The cationic polymer may also be chosen from condensation polymers; which condensation polymers are preferably derived from the reaction of ethylene dichloride and ammonia, ethylene dichloride, ammonia, and ethylenediamine and other polyamines. The condensation cationic polymer is preferably derived by the reaction of epichlorohydrin (EPI) and dimethylamine (DMA), either in the presence or absence of any cross-linking agents, to form either linear EPI-DMA polymers or to form branched and/or cross-linked EPI-DMA polymers. These branched and cross-linked EPI-DMA polymers may be obtained by reacting epichlorohydrin and dimethylamine in the presence of prescribed amounts of any cross linking agent chosen from the group consisting of ammonia, ethylene diamine, hexamethylenediamine, and mixtures thereof.

THE PREFERRED CATIONIC POLYMER

The preferred cationic polymer is a polymer having a weight average molecular weight ranging from about 2000 to about 50,000 and is a linear EPI-DMA polymer or a mixture of polymers which contains linear polymers of epichlorohydrin and dimethylamine. These linear EPI-DMA polymers are obtained by reacting epichlorohydrin and DMA in a mole ratio ranging from about 0.95:1.0 to about 1.05:1.0. The polymers may also contain either branched and cross-linked EPI-DMA polymers which polymers are cross-linked or branched by adding various cross-linking/branching agents chosen from the group of amines such as ammonia, ethylene diamine, hexamethylene diamine, and mixtures thereof, and wherein the cross-linking/branching agent is present at from about 0.10 to about 10.0 weight percent of the polymer. Preferably the cross linking agent is present at from about 0.1 to about 2.0 weight percent of total polymer weight.

Although the preferred polymer is an EPI-DMA polymer which is essentially linear in nature and formed simply by the reaction of epichlorohydrin and dimethylamine, at the appropriate mole ratios stated above, other condensation polymers such as those polymers obtained by reacting essentially molar equivalent amounts of ethylenedichloride and ammonium or ethylenedichloride and ammonia with varying molar amounts of methyl chloride to form a quaternary condensation polymer may also be used in this invention. The preferred ethylenedichloride ammonia polymer is a polymer that contains ethylenedichloride and ammonia in molar ratios ranging from about 0.95:1 to about 1.05:1 wherein the amine nitrogens in the polymer have been quaternized by reacting with methyl chloride, dimethylsulfate, or other quaternizing agents, such that at least 10 mole percent of the amino nitrogen contained in the condensate polymer backbone has been quaternized. Again the weight average molecular weight for any of these condensation polymers ranges (all molecular weights described herein are weight average molecular weights) between about 2,000 to about 75,000. The preferred molecular weight is from about 2,500 to about 50,000, and the most preferred molecular weight is from 3,000 to about 30,000.

Although not as efficient as the condensate polymers, the DADMAC vinylic polymers can also be effectively used in the practice of our invention. These poly DADMAC polymers preferably contain at least 80 mole percent diallyldimethyl ammonium chloride, or an equivalent salt thereof, and most preferably contain 100 mole percent diallyldimethyl ammonium chloride, that is a homopolymer of DADMAC. These homopolymers have a weight average molecular weight ranging from about 25,000 to about 150,000, with the preferred molecular weight ranging from about 50,000 to about 150,000.

The cationic polymers used to destabilize the phosphorous containing oily waste emulsions may also be combined with such inorganic destabilizing components such as alum, ferric sulfate, aluminum hydroxy chlorides, poly aluminum hydroxy chlorides, and the like.

These polymers may be added initially to the oily waste emulsion or they may be added after the addition of a finely divided water insoluble filter aid. The order of addition of the cationic polymer and the finely divided water insoluble filter aid appears to be of no consequence, but it is important that both the low molecular weight cationic polymer and the water insoluble filter aid be present and effectively mixed with the phosphorous containing oily waste emulsions prior to any attempt to separate the components of these waste emulsions and recover clarified, environmentally accepted waters and waste materials for disposal.

THE FILTER AIDS

The filter aids are any materials which are water insoluble and have average particle sizes ranging anywhere from about 0.5 microns to about 1000 microns in size. Average particle size distribution may be relatively narrow or may be broad. In addition, particle sizes may be multi distributed in such a way that certain particles may have average particle size ranging from about 0.5 to about 250 microns and other particles in the filter aid may have particle sizes ranging from about 100 to about 1000 microns in size. Any mixture of these average particle sizes in any type of size distribution is useful in the invention.

The filter aids are primarily those filter aids having the above described particle sizes, which particle sizes are distributed in any of a multitude of ways and which filter aids are chosen from the group consisting of diatomaceous earths, cellulose, carbon, fly ash, silica, alumina, crushed coal, aluminosilicates, and the like, or mixtures thereof. The preferred filter aids have a particle size ranging from about 1 micron to about 250 microns and are chosen from the group consisting of diatomaceous earth, cellulose, finely divided carbon, crushed coal, fly ash, silica, and mixtures thereof.

SEPARATION

After the low molecular weight cationic polymer and the filter aids have been added to the oily waste emulsions, this slurry, referred to herein as the coacervate slurry, is mixed and separated into its component parts. The separation step may include filtration, centrifugation, settling, and clarification steps as are known in the art. The preferred method of separation is by filtration through a filter cloth or filter medium which is capable of removing the coacervate slurry sludge and particulate matter from the water phase, thereby recovering a filter cake and a clarified water phase.

In the filtration process, any type of filtration mechanism may be used. It is however preferred that the filtering mechanisms be either a plate and frame filter press or a recessed chamber filter press containing a filter cloth, which filter cloth optionally may be pre-coated with either the same filter aid or a different filter aid as used to form the coacervate slurry described above. The filter cloth may also be effectively pre-coated with the coacervate slurry. After the coacervate slurry is formed, it may be filtered directly through a filter cloth, preferably, as described before, installed on either a plate and frame filter or a recessed chamber filter press, which filter cloth has optionally been pre-coated with the filter aids described above. The filter aids used to pre-coat the filter cloths may be optional, but without the pre-coating, the filter cloth has more of a tendency to cause poor release of the cake from the cloth. Although operating without a precoating is feasible, particularly at higher levels of body feed of filter aid, this type of operation would result in a poor release of filter cake.

The preferred operation involves both a body feed and a pre-coat of filter aid onto a filter cloth in the filter unit being used. Preferably the filtration occurs through a recessed chamber filter press and uses a filter cloth which is pre-coated with filter aid according to the results presented in the examples later reviewed. Using a pre-coated filter cloth, the filter cake releases easily from the filter cloth and, when using a silica/carbon or cellulose filter aids for both pre-coat and body feed, provides for a filter cake that can be destroyed by combustion leaving behind extremely small residual ash. The effluent obtained from the filter press maybe discharged to normal waste water treatment facilities and then to the environment or may be, if required, recycled for various process uses.

OPTIONAL TREATMENTS

Before, During or after the oily waste, phosphorous containing, emulsions have been treated with the cationic polymers and the finely divided water insoluble filter aids, thereby forming the coacervate slurry as described above, these slurries may be separated as described earlier by filtration, by clarification, by centrifugation or like techniques. Optionally, these destabilized oily waste phosphorous containing emulsions may also be treated with high molecular weight coagulating polymers and/or high molecular weight flocculating polymers.

Normally, after forming the coacervate slurry, the particles of this slurry contain a net cationic charge. As a result, the effective coagulating polymers are preferably those polymers chosen from anionic polymers having a weight average molecular weight of at least 1 million, preferably from 1 million to about 30 million, and most preferably from about 2 million to about 20 million. These anionic polymers may be homopolymers or copolymers of at least one of the following anionic monomers; acrylic acid, methacrylic acid, maleic acid or maleic anhydride, fumaric acid or fumaric anhydride, acrylamido methyl propane sulfonate (AMPS®)[2], or polymers obtained by reacting amide containing polymers with materials capable of providing for sulfonate functionality on the acrylamide backbone. (See for example, U.S. Pat. No. 4703092, incorporated herein by reference.) In addition to these anionic monomers and the anionic homopolymers derived therefrom, the anionic high molecular weight coagulating polymer may also contain neutral monomers such as acrylamide, methacrylamide, methylacrylate, ethylacrylate, and similar monomers of a neutral character. These copolymers are preferably those copolymers of acrylic acid and acrylamide and preferably are those copolymers containing from about 10 or to about 90, most preferably between about 20–80, mole percent of an anionic monomer chosen from the group consisting of acrylic acid, methyacrylic acid, and AMPS and from about 90 to about 10, most preferably 80–20, mole percent of at least one nonionic monomer chosen from acrylamide, methacrylamide, and the like. The most preferred anionic coagulating polymer has a molecular weight ranging from about 2 million to about 20 million and contains from about 20 to 40 mole percent acrylic acid, either as a free acid or as the sodium or ammonium salt thereof, and from about 80 to about 60 mole percent of acrylamide.

[2] AMPS® is a Registered Trademark of Lubrizol

Following the optional addition of these anionic coagulating polymers, the waste slurries may also have added thereto an effective flocculating amount of a vinylic cationic polymer having a weight average molecular weight of at least 1 million. These high molecular weight cationic polymers are homopolymers or copolymers of vinyl cationic monomers such as, but not necessarily limited to MAPTAC, dimethylaminomethylacrylate, dimethyaminoethylacrylate, dimethylaminomethylacrylate, dimethylaminomethylmethacrylate, or the lower alkyl ($C_1$–$C_4$) quaternary salts derived from these monomeric units. These materials may also contain diallyldimethyammonium chloride and such other cationic vinyl monomers as may be found desirable. Preferably these high molecular weight polymers are copolymers, thereby easily providing molecular weight requirements of from about i million to about i5 million, preferably from about 1.5 million to about 10 million with such neutral monomers as earlier described, that is acrylamide, methylacrylamide, and the like.

The preferred cationic vinylic flocculating polymer useful in this invention is a copolymer of dimethylaminoethylmethacrylate which has been quaternized with methylchloride, dimethylsulfate or similar quaternizing agents. This monomer is copolymerized with acrylamide in such a way that the dimethylaminoethylacrylate-methyl quaternary salt monomer is present at from about 30–40 mole percent and the acrylamide monomer is present at from about 70–60 mole percent. These polymers have a preferred molecular weight ranging between about 1.5 million and about 10 million.

DOSAGES

Each of the active ingredients used to treat the phosphorous containing oily waste emulsions are added at a prescribed dosage rate which dosage rate can vary depending upon the total amount of organic content in the emulsions and/or the total amount of suspended solids in the emulsions. The organic amounts present in the emulsions are generally measured by standard total organic carbon (TOC) or chemical oxygen demand (COD) techniques and the total solids (TS) are measured simply by weighing out a prescribed amount of the waste emulsion and drying in an oven at 105° C. to a constant weight. The TOC or COD measurements are made according to techniques known to the artisan.

As the COD/TS of the emulsion increases, the preferred treatment dosage also increases. As formed in the polyester fiber finishing plant, the waste emulsions containing phosphorous normally have a TOC ranging from about 1,000 ppm to about 3,000 ppm and a COD ranging normally from about 7,000 ppm up to and sometimes exceeding about 15,000 ppm. In this range of TOC and COD, the normal treatment dosage for the low molecular weight cationic polymer (weight average molecular weight ranging from 2,500 to about 150,000) i.e., the destabilizing cationic polymer, ranges from about 1,000 ppm to about 6,000 ppm, based on weight of emulsion treated. The preferred dosage of this destabilizing polymer ranges from about 1500 ppm to about 3,500 ppm, again depending upon the character of the phosphorous containing oily waste emulsion being treated.

Similarly, the filter aid dosage normally ranges between about I gram per liter of emulsion being treated up to and including about 100 grams/liter of emulsion being treated. This treatment range varies not only with the character of the emulsion but also with the choice of filter aid to be used. Filter aids preferred are organic in nature and include cellulose and carbon, graphite, ground coal, and the like. Also, filter aids which are mixtures of silicas and carbons are preferred. The preferred treatment range for the so called "body feed" addition of filter aids normally is between about 2.5 grams/liter up to and including about 20 grams/liter and is most preferably between about 3 grams/liter and about 10 grams/liter.

The high molecular weight anionic coagulant is added at a concentration ranging from about 0 to about 500 ppm, when it is used. Preferably, when used in our process, this concentration dosage ranges from about 5 to about 200 ppm, based on total emulsion being treated, and most preferably the anionic coagulant is added between about 10 to about 180 ppm, based on emulsion being treated.

The cationic flocculant is normally added at similar concentrations to those described above for the anionic coagulant. Preferably, when the dimethylaminoethylmethylacrylatemethyl chloride quaternary based polymers are used, they are used at concentrations ranging from about 5 to about 150 ppm, based upon total emulsion being treated.

SEQUENTIAL ADDITION

The order of addition of the above ingredients appears immaterial. The ingredients can all be added simultaneously if desired to the phosphorous containing oily waste emulsions, mixed, and filtered. However, for preferred operational control and when certain benefits can be derived, a sequential addition of ingredients may be used.

For example, the phosphorous containing oily waste emulsion, as received from the polyester finishing plant may be stored in tanks or storage vessels and then fed into a treatment vessel where the emulsion destabilizing low molecular weight cationic polymer is added in line, sometimes mixed in line, and then added to a treatment vessel to which the other ingredients are also added. However, this emulsion may be added to a treatment vessel to which all of the ingredients are added either singly or sequentially. It is preferred in a sequential addition sequence, to add the anionic flocculating polymer, followed by the addition of the destabilizing cationic polymer and then the filter aid, however, both the coagulating polymer and the flocculating polymer may be added before or after the addition of the filter aid.

Since the coagulating high molecular weight (HMW) polymers and the flocculating high molecular weight polymers are both optional ingredients, although in some cases preferred, they can be added at zero concentration, that is not added at all. Both ingredients are optional, the anionic coagulant perhaps being less likely in its absence to have negative effects. However, initial addition of the HMW anionic polymer has been shown to increase floc size, and can provide a most preferred method of practising our invention.

If sequential addition is anticipated, the sequential addition may occur in any of the following sequences:
 I cationic destabilizing low molecular weight polymer
 II. filter aid.
Optionally a sequence may be as follows:
 I. filter aid
 II. destabilizing low molecular weight cationic polymer.
Optionally a sequence may include:
 I. filter aid
 II. destabilizing cationic polymer
 III. high molecular weight anionic coagulant
 IV. high molecular weight cationic flocculant.

Also optionally, the above sequence may be followed absent the anionic high molecular weight coagulant, or with the reversal of the addition of filter aid and emulsion destabilizing cationic low molecular weight polymer.

Other sequential treatments may also be practiced. Best results are obtained when the oily waste emulsion if first treated with high molecular weight anionic polymer, followed in sequence by the addition of:
 1) Low molecular weight cationic destabilizing polymer
 2) Filter aid
 3) High molecular weight cationic flocculant To better describe our invention, the following examples are given.

EXAMPLES

1. A waste emulsion was received from a polyester fiber finishing plant using as a finishing treatment an oil-in-water emulsion containing phosphorous, which phosphorous was at least partially provided for by chemicals described in Formula 1 above. Other characteristics of this phosphorous containing oily waste emulsion included a chemical oxygen demand (in ppm oxygen) ranging between about 7,000 and about 13,000. Untreated waste emulsion TOC ranged from about 1,000 to about 3,000, and turbidity was measured at from about 150 to about 350 NTU's. The pH ranged from about 6.3 to about 7.0 and percent solids (TS) ranged from about 0.25 to about 0.6 weight percent.

To various samples of this oily waste phosphorous containing emulsion, a number of different destabilizing/emulsion breaking low molecular weight cationic polymers were added. FIG. demonstrates both the dosage and the type of destabilizing polymers used to effect the breaking or destabilization of these waste emulsions. Table 1 provides data obtained from multiple samples of waste emulsion and initial screening results obtained using various destabilizing cationic polymers.

TABLE 1

| SAMPLE | A | B | C | D |
|---|---|---|---|---|
| PERCENT SOLIDS | 0.31 | 0.36 | 0.56 | 0.58 |
| P.H. | 6.37 | 6.62 | 6.77 | 6.8 |
| TURBIDITY (N.T.U.) | 325 | 325 | 255 | 210 |
| EMULSION T.O.C. | 1400 | 1100 | 2800 | 2000 |
| EMULSION C.O.D. | .7200 | 7800 | 13000 | 8700 |
| OPTIMUM P-10 DOSAGE | 1000–1400 ppm | 1600–1800 ppm | 2600–2800 ppm | 1800–2200 ppm |
| OVERDOSE CORRECTION POSSIBLE? | | yes | yes | yes |
| SUPERNATE T.O.C. | | 200 | | |
| SUPERNATE C.O.D. | | 820 | | |
| BREAK AT 40° F.?(P-10) | | | | |
| 40° F. O.D. CORRECTION POSSIBLE? | | | | |
| BREAK AT 90° F.?(P-10) | | yes | | yes |
| 90° F. O.D. CORRECTION POSSIBLE? | | | | |
| BREAK AT 120° F.?(P-10) | | | | |
| 120° F. O.D. CORRECTION POSSIBLE? | | | | |
| OPTIMUM P-1 BREAKING DOSAGE* | | | | |
| FLOCC. POSS?/SUPERNATE APPEAR. | | | | |
| OPTIMUM P-2 BREAKING DOSAGE* | | | | |
| FLOCC. POSS.?/SUPERNATE APPEAR. | | | | |
| OPTIMUM P-3 BREAKING DOSAGE* | | | | |
| FLOCC. POSS.?/SUPERNATE APPEAR. | | | | |
| OPTIMUM P-4 BREAKING DOSAGE | | | | |
| FLOCC. POSS.?/SUPERNATE APPEAR. | | | | |
| OPTIMUM P-5 BREAKING DOSAGE | | | | |
| FLOCC. POSS.?/SUPERNATE APPEAR. | | | | |
| OPTIMUM P-6 BREAKING DOSAGE | | | | |
| FLOCC. POSS.?/SUPERNATE APPEAR. | | | | |
| OPTIMUM P-7 BREAKING DOSAGE | | | | |
| FLOCC. POSS.?/SUPERNATE APPEAR. | | | | |
| OPTIMUM P-8 BREAKING DOSAGE | | | | |
| FLOCC. POSS.?/SUPERNATE APPEAR. | | | | |
| OPTIMUM P-9 BREAKING DOSAGE | | | 1800–2200 ppm | 2000–2400 ppm |
| FLOCC. POSS.?/SUPERNATE APPEAR. | | | none/cloudy | none/clear |

*The pH of the waste was dropped to 6.0 before treatment.

| SAMPLE | E | F | G | H |
|---|---|---|---|---|
| PERCENT SOLIDS | 0.35 | 0.41 | 0.275 | 0.31 |
| P.H. | 6.83 | 6.73 | 6.64 | 6.58 |
| TURBIDITY (N.T.U.) | 300 | 500 | 150 | 220 |
| EMULSION T.O.C. | 2900 | 2900 | 1700 | 1800 |
| EMULSION C.O.D. | 13000 | 13000 | 7300 | 7600 |
| OPTIMUM P-10 DOSAGE | 2600–2800 ppm | 2400–2600 ppm | 1400–1600 ppm | 1600–1800 ppm |
| OVERDOSE CORRECTION POSSIBLE? | | | | |
| SUPERNATE T.O.C. | | | 340 | |
| SUPERNATE C.O.D. | | | 1100 | |
| BREAK AT 40° F.?(P-10) | | | | no |
| 40° F. O.D. CORRECTION POSSIBLE? | | | | no |
| BREAK AT 90° F.?(P-10) | | | | yes |
| 90° F. O.D. CORRECTION POSSIBLE? | | | | yes |
| BREAK AT 120° F.?(P-10) | | | | yes |
| 120° F. O.D. CORRECTION POSSIBLE? | | | | yes |
| OPTIMUM P-1 BREAKING DOSAGE* | 3600–3800 ppm | 4800–5000 ppm | | |
| FLOCC. POSS?/SUPERNATE APPEAR. | good/cloudy | not good/cloudy | | |
| OPTIMUM P-2 BREAKING DOSAGE* | 4400–4600 ppm | 5000–5400 ppm | | |
| FLOCC. POSS.?/SUPERNATE APPEAR. | not good/cloudy | OK/cloudy | | |
| OPTIMUM P-3 BREAKING DOSAGE* | 3000–4000 ppm | 4600–5000 ppm | | |
| FLOCC. POSS.?/SUPERNATE APPEAR. | OK/cloudy | good/cloudy | | |
| OPTIMUM P-4 BREAKING DOSAGE | 3000–3200 ppm | 2800–3200 ppm | | |
| FLOCC. POSS.?/SUPERNATE APPEAR. | OK/clear | OK/cloudy | | |
| OPTIMUM P-5 BREAKING DOSAGE | 3600–3800 ppm | 3600–3800 ppm | | |
| FLOCC. POSS.?/SUPERNATE APPEAR. | OK/cloudy | good/clear | | |
| OPTIMUM P-6 BREAKING DOSAGE | 2800–3000 ppm | no good break | | |
| FLOCC. POSS.?/SUPERNATE APPEAR. | OK/cloudy | no/none | | |
| OPTIMUM P-7 BREAKING DOSAGE | 2400–2600 ppm | 2400–2800 ppm | | |
| FLOCC. POSS.?/SUPERNATE APPEAR. | not good/cloudy | none/cloudy | | |
| OPTIMUM P-8 BREAKING DOSAGE | 2200–2400 ppm | 2600–2800 ppm | | |
| FLOCC. POSS.?/SUPERNATE APPEAR. | none/cloudy | none/cloudy | | |
| OPTIMUM P-9 BREAKING DOSAGE | 2800–3200 ppm | | | |
| FLOCC. POSS.?/SUPERNATE APPEAR. | none/clear | | | |

In FIG. 1, polymer 1 is a condensation polymer of ethylene dichloride and ammonia having a molecular weight ranging from between about 10,000 and about 50,000.

Polymer 2 is a condensation polymer of ethylene dichloride and ammonia having a molecular weight different from polymer 1, but still within the same molecular weight range of 10,000 to about 50,000.

Polymer 3 is a condensation polymer of ethylene dichloride and ammonia which has been quaternized by the reaction with methylchloride. This polymer molecular weight is between about 20,000–75,000.

Polymer 4 is a condensation polymer of epichlorohydrin and dimethylamine and cross linked by the addition of a small amount of hexamethylene, diamine. This EPI-DMA-HMDA polymer has a molecular weight ranging between about 75,000 to about 100,000.

Polymer 5 is a condensation polymer derived from epichlorohydrin and dimethylamine crosslinked with ammonia which polymer has a molecular weight ranging from about 30,000 to about 75,000.

Polymer 6 is a homopolymer of diallyldimethylammonium chloride having a molecular weight of approximately 45,000–60,000.

Polymer 7 is a homopolymer of diallyldimethyl ammonium chloride having a molecular weight ranging from about 95,000 to about 105,000.

Polymer 8 is a homopolymer of DADMAC having a molecular weight average of approximately 150,000.

Polymer 9, is in fact a combination of one of the previous poly DADMACS with ferric sulfate. The addition of ferric sulfate does not provide any profound additional benefits.

Polymer 10 is a linear condensation polymer derived by reacting essentially equal molar amounts of epichlorohydrin and dimethylamine and has a molecular weight ranging from between about 3000 and about 30,000.

As can be seen from observing dosages required to destabilize or break the emulsion these various products all have different efficiencies for breaking the emulsion or destabilizing these waste emulsions.

Visual observations, in addition to the concentration profiles for the various polymers described in FIG. 1, led to continued work with the polymer 10 type of product. This type of product is preferable, not necessarily because of its dosage range but because it provides for better clarity in the supernatant. Although all of the products in FIG. 1 function in the invention, polymer 10 provides for better clarity. Also, polymers 4 and 5 provide for improved clarities over the other condensation or vinylic cationic low molecular weight polymers exemplified above.

When attempts were made to filter the emulsions treated with the polymers alone either through a filter cloth or through a filter cloth that had been pre-coated with a filter aid, the filters blinded quickly. The filter aids were then added, as so called body feed, to the destabilized emulsions, prior to filtration, to form the coacervate slurry.

Various experiments were completed by adding filter aid to the emulsions either as received or as treated with the destabilizing cationic low molecular weight polymers. The results are provided in Tables 2, 3 and 4, which tables contain various tests done with a number of different filter aid pre-coats and filter aid body feeds, different emulsions, different grades of similar filter aids, for example the cellulose filter aids, and various concentrations of pre-coat and body feed used to treat these oily waste phosphorous containing emulsions. By using body feed, another name used herein to describe the addition of filter aids to the emulsion or the destabilized emulsion, either in the presence or absence of pre-coats on filter cloths, very much improved supernatant clarity and supernatant character are obtained which supernatants have had removed at least 85%, preferably 90+%, of the chemical oxygen demand and at least 40% of the phosphorous content, or higher.

TABLE 2

Experimental Results

| Run No. | Pre-Coat grams | Body Feed gms/liter | Cake Solids % | P ppm | COD ppm | TOC ppm | BTU per LB |
|---|---|---|---|---|---|---|---|
| *DE pre-coat and DE body feed* | | | | | | | |
| 1 | 10 | .5 | 41 | | | | |
| 2 | 10 | 6.25 | 38 | | | | |
| 3 | 10 | 7.5 | 40 | | | | |
| 3A | 7.5 | 7.5 | 36 | | | | |
| 3B | 5 | 7.5 | 32 | | | | |
| *DE Pre-Coat and Enviroguard Body Feed* | | | | | | | |
| 4 | 10 | 7.5 | 56 | | | | |
| 5 | 5 | 5 | 52 | 60 | 660 | 130 | |
| 6 | 3 | 3.3 | 44 | 60 | 650 | 140 | |
| 7 | 3 | 5 | 53 | 62 | 680 | 150 | |
| 8 | 5 | 5 | 56 | 52 | 890 | 200 | |
| 9 | 5 | 6.5 | 42 | 52 | 790 | 210 | |
| 10 | 3 | 5 | 38 | 54 | 870 | 230 | |
| *Enviroguard pre-coat and body feed* | | | | | | | |
| 11 | 5 | 6.6 | 42 | 63 | 1300 | 340 | |
| 12 | 3 | 4.0 | 46 | 44 | 700 | 200 | |
| 13 | 5 | 5.0 | 48 | 49 | 690 | 210 | |
| 25 | 5 | 5 | 46 | | | | |
| 27 | 5 | 2.5 | 44 | 110 | 710 | 232 | 3310 |
| *Cellulose pre-coat and body feed* | | | | | | | |
| 14 | 5 | 5 | 34 BH100 | | | | |
| 15 | 3 | 5 | 36 | | | | |
| 16 | 1.5 | 3.75 | 40 | | | | |
| 17 | 3.0 | 2.5 | 38 | | | | |
| 18 | 5 | 5 | 42 BH40 | 49 | 559 | 191 | 4920 |
| 19 | 3 | 3.75 | 32 | | | | 3845 |
| 20 | 5 | 5 | 45 C40 | | | | |
| 21 | 3 | 3.75 | 43 | | | | |
| 22 | 1.5 | 2.5 | 44 | 52 | 518 | 197 | |
| 24 | 1.5 | 1.5 | 40 C40 | 62 | 872 | 395 | |
| 26 | 1.5 | 2.5 | 39 C40 | 100 | 645 | 221 | 4850 |

TABLE 2-continued

| | | | Experimental Results | | | | |
|---|---|---|---|---|---|---|---|
| | Pre-Coat | Body Feed | Cake | | Results | | |
| Run No. | grams | gms/liter | Solids % | P ppm | COD ppm | TOC ppm | BTU per LB |
| | | | Clay pre-coat and body feed | | | | |
| 23 | 5 | 5 | 26 | | | | |

TABLE 3

Filtrate and Emulsion Analysis

| | | | | Filtrate Analysis | | |
|---|---|---|---|---|---|---|
| Run No. | Pre-Coat grams | Body Feed gms/liter | Cake Solids % | P ppm | TOC ppm | COD ppm |
| 0.3% OILY WASTE SAMPLE | | | | 110 | 1800 | 8000 |
| DE Pre-Coat and Enviroguard Body Feed | | | | | | |
| 5 | 5 | 5 | 52 | 60 | 130 | 660 |
| 6 | 3 | 3.3 | 44 | 60 | 140 | 650 |
| 7 | 3 | 5 | 53 | 62 | 150 | 680 |
| 8 | 5 | 5 | 56 | 52 | 200 | 890 |
| 9 | 5 | 6.5 | 42 | 52 | 210 | 790 |
| 10 | 3 | 5 | 38 | 54 | 230 | 870 |
| Enviroguard pre-coat and body feed | | | | | | |
| 11 | 5 | 6.6 | 42 | 63 | 340 | 1300 |
| 12 | 3 | 4.0 | 46 | 44 | 200 | 700 |

TABLE 4

Minimum Dose of Filter Aid

| Run No. | Pre-coat gms | Body feed gms/liter | Cake solids % | Comments |
|---|---|---|---|---|
| 3A | 7.5 | 7.5 | 36 | DE pre-coat and body feed |
| 13 | 5 | 10 | 48 | Enviroguard |
| 22 | 1.5 | 2.5 | 44 | Cellulose C40 |

As can be seen, the use of cellulose and/or carbon based filter aids provide for the additional benefit of providing a filter cake that has a very high BTU value, which filter cake can be incinerated, providing extremely low ash residues. This is extremely advantageous for environmental purposes.

PILOT EVALUATION

A pilot experimental operation was set up at a polyester fiber finishing plant located in the United States. Table 5 presents the results of using a preferred technique of treating these waste emulsions. Each run in Table 5 was performed with a different supply of waste phosphorous containing oily emulsions derived directly from the manufacturing operations. The filter aid used, the initial emulsion COD and total solids are presented. For comparison purposes, the filtrate COD and total suspended solids, the percent cake solids achieved in the filtration process, the BTU per pound cake heat value, and the percent COD removal are presented.

The process practiced is set forth basically in FIG. 2 and includes supplying to a treatment reactor or tank equipped with a stirrer for agitation, the oily waste emulsion, emulsion destabilizing low molecular weight cationic polymer, body feed filter aid, a high molecular weight anionic coagulating polymer, and a high molecular weight cationic flocculating polymer. This mixture of ingredients is agitated over an appropriate length of time and then portions are taken from this reaction vessel and fed into a line which leads directly to a recessed chamber filter press. The filter press cloth could be pre-coated as required. The filter press can be operated at a pressure of from about 1 psig up to about 150 psig. In our tests, the pressure was from about 5 to about 150 psig. This filter press operation obtained a filtered cake having about 50 weight percent solids and a clarified filtrate from which had been removed at least 85 or above percent of the chemical oxygen demand relative to the starting waste emulsion.

Table 5, presents a summary of these results. Enviroguard is a commercial filter aid which is a combination product containing silica and carbon. Alphacel is a commercial product which is a filter aid based on cellulose.

The filter cakes obtained, particularly using the Alphacel filter aids, have very high BTU per pound filter cake heat values and are easily combusted leaving extremely small ash values, i.e. less than about 0.5 weight percent of total cake, after combustion.

TABLE 5

SPENT FINISH EMULSION EVALUATION

| | | EMULSION | | | FILTRATE | FILTRATE | | CAKE HEAT | |
|---|---|---|---|---|---|---|---|---|---|
| RUN NO. | BATCH SIZE (GALLONS) | FILTER AID USED | COD (PPM) | EMULSION % SOLIDS | COD (PPM) | TS (PPM) | % CAKE SOLIDS | VALUE (BTU/LB) | % COD REMOVAL |
| 1 | 500 | ENVIROGUARD | 5,866 | 0.32 | 653 | 3 | 50 | 4,945 | 88.9 |
| 2 | 350 | ENVIROGUARD | 5,484 | 0.30 | 640 | 16 | 50 | 5,119 | 88.3 |
| 3 | 350 | ENVIROGUARD | 5,484 | 0.30 | 640 | 16 | 65 | 5,414 | 88.3 |
| 4 | 433 | ENVIROGUARD | 5,714 | 0.33 | 624 | 14 | 70 | 6,400 | 89.1 |
| 5 | 400 | ENVIROGUARD | 7,512 | 0.42 | 959 | 26 | 61 | 7,084 | 87.2 |
| 6 | 350 | ALPHACEL | N/A | N/A | 776 | 34 | 65 | 10,450 | N/A |
| 7 | 400 | ALPHACEL | 4,715 | 0.28 | 732 | 19 | 67 | 10,450 | 84.5 |
| 8 | 200 | ALPHACEL | 16,850 | 1.1 | 776 | 31 | 67 | 10,450 | 95.4 |

EXAMPLE OF PREFERRED METHOD

A waste emulsion received from fiber finishing plant had chemical oxygen demand (COD) of about 11640 and was treated in the laboratory using a nine liter stirred cylindrical vessel. The following products were added sequentially. 1. 120 ppm of high molecular weight anionic flocculant 2. 2,000 ppm of cationic destabilizing low molecular weight polymer 3. 3 grams per liter of cellulose 4. 60 ppm of high molecular weight cationic flocculant At these optimum doses of cationic destabilizing low molecular weight polymer, the particles developed were relatively large and the water was extremely clear.

The particle size was dramatically larger compared to direct addition of cationic destabilizing low molecular weight polymer, preceeding addition of the anionic flocculant. The slurry was filtered through a recessed chamber filter press and the filtrate was clear. Analysis of the filtrate indicated a COD of 1476.

When the emulsion was treated with cationic destabilizing low molecular weight polymer, the optimum dose was determined by any one of the following sensors.

a. Light reflectance sensor

It measures the difference in the light reflected between the particles and water through fiber-optics. At an optimum dose, the signal from the sensor rises rapidly and reaches maximu. FIG. III shows a response as a function of cationic destabilizing low molecular weight polymer.

b. Streaming current detector (SCD)

It measures the electric current generated between two electrodes immersed in a continuous flowing water stream by free, charged counter-ions that are hydraulically sheared from colloidal particles adsorbed on the walls of the cell. At optimum does, the signal from the SCD increases sharply. FIG. IV shows SCD response as a function of cationic destabilizing low molecular weight polymer.

c. Conductivity

It measures the conductivity of the wastewater and any changes as cationic destabilizing low molecular weight polymer is added. At optimum does, sharp rise in conductivity is observed as shown in FIG. V.

Having described our invention, we claim:

1. A treatment process for treating phosphorous containing oily waste emulsions containing fatty acid esters obtained from polyester fiber of phosphonic acids finishing operations, which treating process comprises treating said phosphorous containing oily waste emulsion containing the fatty acid esters with an effective emulsion destabilizing amount of a cationic emulsion destabilizing polymer having a weight average molecular weight ranging from about 1000 to about 500,000 and an effective coacervating amount of a finely divided water insoluble filter aid, mixing and forming a coacervated slurry containing said esters in water and then removing the slurry phase containing fatty acid esters of phosphoric acids from the water phase, discarding the slurry phase, and either discharging or recycling the water phase.

2. The process of claim 1 wherein the cationic emulsion destabilizing polymer is chosen from the group consisting of condensation polymers and vinylic polymers, and mixtures thereof, and wherein the weight average molecular weight ranges from 1000 to about 500,000.

3. The process of claim 2 wherein the condensation polymer is chosen from the group consisting of condensation polymers of ethylenedichloride and ammonia, condensation of epichlorohyrdrin and dimethyl amine, condensation polymers of epichlorohydrin, dimethylamine and branching and cross-linking agents chosen from the group consisting of ammonia, ethylene diamine, hexamethylenediamine and mixtures thereof, or mixtures of condensation polymers derived from ethylenedichloride ammonia and epichlorohydrin dimethylamine, with or without said cross linking agents.

4. The process of claim 2 wherein the vinylic cationic polymer contains at least 50 mole percent diallyldimethyl ammonium chloride and has a molecular weight ranging from about 50,000 to about 150,000.

5. The process of claims 1, 2, 3, or 4 wherein the filter aid has an average particular size ranging from about 0.5 microns to about 500 microns and is chosen from the group consisting of diatomaceous earth, cellulose, carbon, graphite, fly ash, silica, coal, aluminosilicates, and mixtures thereof, and further, wherein the oily waste emulsions are at a temperature of at least 90° F.

6. The process of claim 1 wherein in any sequence with the addition of the emulsion destabilizing amount of the cationic polymer and the addition of the filter aid, the oily waste emulsion is treated with an effective coagulating amount of an anionic polymer having a weight average molecular weight of at least 1 million.

7. The process of claim 6 wherein the operating temperature is at least 90° F and the anionic polymer is added prior to the addition of cationic polymer.

8. The process of claim 1 wherein in any sequence with the addition of the emulsion destabilizing amount of cationic polymer and the addition of the filter aid, the oily waste emulsion is treated with an effective flocculating amount of a vinylic cationic polymer having a weight average molecular weight of at least 1 million.

9. The process of claim 8 wherein, prior to the addition of the emulsion destabilizing amount of cationic polymer, the oily waste emulsion is treated with effective flocculation amount of a vinylic anionic polymer having a molecular weight of at least one million.

10. The process of claim 1 wherein in any incremental sequence or simultaneously with the addition of the cationic emulsion destabilizing polymer and the filter aid, the waste emulsion is also treated in any sequence with an effective amount each for the purpose of an anionic coagulating polymer and a cationic flocculating polymer, such that the phosphorous containing waste oily emulsion is treated in any sequence with:
  a) cationic emulsion destabilizing polymer,
  b) anionic coagulating polymer having a molecular weight of at least 1 million,
  c) cationic flocculating polymer having a molecular weight of at least 1 million, and
  d) filter aid, thereby forming an improved coacervate slurry containing the fatty acid ester, which improved coacervate slurry is filtered through a filter cloth, which filter cloth is first pre-coated with either the filter aid used to form the coacervate slurry, or a different filter aid, or is pre-coated with the coacervate slurry.

11. The process of claim 10 wherein the oily waste emulsion is maintained at a temperature ranging from 90°–150° F.

12. A process for treating phosphorous containing oily waste emulsions containing fatty acid esters of phorphoric acids obtained from polyester fiber finishing which process comprises the steps:
  a) collecting said oily waste emulsions;
  b) treating, with mixing, said oily waste emulsions with:
    1) an emulsion destabilizing amount of a cationic polymer having a molecular weight of less than 1 million.
    2) a coagulating amount of a vinylic anionic coagulating polymer having a molecular weight of at least 1 million;

3) a flocculating amount of a vinylic cationic flocculating polymer having a molecular weight of at least 1 million; and
4) a coacervate slurry forming amount of a filter aid, thereby forming an improved coacervate slurry containing fatty acid esters of phosphoric acids, and then c) filtering said improved coacervate slurry through a filter aid pre-coated filter cloth, thereby forming a clarified aqueous phase and a filter cake containing the fatty acid esters and d) disposing of the filter cake, and e) discharging or recycling the clarified aqueous phase.

13. The process of claim 12 wherein the polymers and filter aids are added to the phosphorous containing oily waste emulsions either simultaneously or incrementally and if incrementally are added in any sequence, thereby forming an improved coacervate slurry to be filtered, and further wherein the filter aid is an all organic filter aid chosen from the group consisting of carbon, coal, and cellulose; and further wherein in step d, disposing of the filter cake is by incineration.

14. The process of claim 12 or 13 wherein the cationic emulsion destabilizing polymer is chosen from linear, branched or cross-linked polymers having a weight average molecular weight ranging between about 2000 and about 150,000 and formed by reacting epichlorohydrin and dimethylamine at mole ratios ranging from about 0.95:1.0 to about 1.05:1.0, and optionally, to form cross link polymers, with from 0.10 to about 2 weight percent, based on total polymer weight of a cross linking agent chosen from ammonia, ethylenediamine, hexyamethylenediamine, or mixtures thereof; and the vinylic anionic coagulating polymer has a weight average molecular weight ranging from about 2 million to about 20 million and contains from about 10 to about 90 mole percent of an anionic monomer chosen from acrylic acid, methacrylic acid, fumaric acid, maleic acid or anhydride, and acrylamido methyl propane sulfonate, or mixtures thereof; and further wherein the vinylic cationic flocculating polymer has a weight average molecular weight ranging from about 1 million to about 10 million and contains from about 10 to about 50 mole percent of a cationic monomer chosen from the group consisting of acrylamidepropyltrimethyl ammonium chloride, methacrylamidepropyltrimethyl ammonium chloride, diallyldimethylammonium chloride, dimethylaminoethylacrylate, dimethylaminoethylmethacrylate and dimethylaminoethylmethacrylate methyl chloride quaternary monomers, or mixtures thereof; and further, wherein the filter aid is a low ash filter aid having particle size ranging from between about 0.5 to about 500 microns and is chosen from the group consisting of carbon, cellulose, diatomaceous earth, silica, fly ash, and mixtures thereof.

15. A process of treating phosphorous containing oily waste emulsions containing fatty acid esters of phosphoric acids obtained from Polyester Fiber finishing which process comprises treating said waste emulsions with, in any order, or simultaneously, the following ingredients:

| Ingredient | Treatment Level (based on emulsion) |
| --- | --- |
| (a) emulsion destabilizing cationic polymers having a molecular weight of less than 1 million | 1000 ppm–6000 ppm |
| (b) Filter aid | 1.0–50.0 grams/liter |
| (c) anionic coagulating polymer having a molecular weight of at least 1 million | 0–500 ppm |
| (d) cationic flocculating polymer having a molecular weight of at least 1 million | 0–500 ppm | and then mixing, thereby forming a coacervated waste emulsion containing the fatty acid esters, and then; filtering said coacervated waste emulsion through a pre-coated filter media, thereby forming a filter cake containing the fatty acid ester and clarified water effluent, and then; in any order, collecting and incinerating said filter cake and discharging said effluent.

16. The process of claim 15 wherein:

(a) the emulsion destabilizing cationic polymer is chosen from the group consisting of condensation polymers of ethylenedichloride and $NH_3$ having a weight average molecular weight ranging from about 5000 to about 75,000, linear or branched/-cross-linked condensation polymers of epichlorohydrin and dimethylamine, wherein, when cross-linked, the cross linking agents are chosen from the group consisting of ammonia, ethylene diamine, hexamethyldiamine, and mixtures thereof, and wherein the epichlorohydrin-dimethylamine polymers have a weight average molecular weight ranging from about 2500 to about 35,000, vinylic diallyldimetyyl ammonium chloride homopolymers having a weight average molecular weight ranging from about 50,000 to about 150,000, and mixtures thereof; and (b) the filter aid is chosen from the group consisting of carbon, crushed coal, cellulose, diatomaceous earth, silica, and mixtures thereof; and has an average particle size ranging from about 0.5 microns to about 1000 microns; and (c) the anionic coagulating polymer has a weight average molecular weight ranging from about 1 million to about 20 million and contains at least one of the monomers chosen from the group consisting of acrylic acid, methacrylic acid, acrylamide, methacrylamide, acrylamidomethyl propane sulfonate ®, maleic acid or anhydride wherein at least 10 mole per cent of the polymer is made up from at least one of the anionic monomers chosen from the group consisting of acrylic acid, methacrylic acid, acrylamidomethyl propane sulfonate ®, maleic acid or anhydride, and mixtures thereof; and (d) the cationic flocculating polymer has a weight average molecular weight ranging from about 1 million to about 20 million and contains at least one monomer chosen from the group consisting of acrylamidepropyltrimethyl ammonium chloride, methacrylamidepropyltrimethyl ammonium chloride, diallyldimethylammonium chloride, dimethylaminoethylacrylate, dimethylaminoethylmethacrylate methyl salt quaternary, dimethylaminoethylmethacrylate—methyl salt quaternary, acrylamide, methacrylamide methylacrylate, ethylacrylate, and further provided that the cationic monomer or monomers are present in the polymer at a mole percent of from about 10 to about 50 mole percent; and further provided that (e) the pre-coated filter media is formed with the same filter aid used to treat as body feed the phosphorous containing oily waste emulsion.

17. The process of claim 15 or claim 16 wherein
(a) the emulsion destabilizing cationic polymer is added at between about 1500 to about 2500 ppm;
(b) the filter aid is added at about 2.5 to about 25 grams/liter;
(c) the anionic coagulating polymer is added at about 5–200 ppm; and
(d) the cationic flocculating polymer is added at about 5–200 ppm; and (e) the filter aid is chosen from the group consisting of carbon, coal, cellulose, silica, and mixtures thereof.

18. The process of claims 1, 2, 3, 4, 6, 7, 8, 9, 10, 11, 12, or 13 wherein the effective emulsion destabilizing amount of cationic emulsion destabilizing polymer is determined by measuring the changes which occur when adding said polymer to the phosphorus containing oily waste emulsions said measurement being made by light reflectance measurement using fiber optic detectors, conductivity measurements, streaming current electrode detectors, or any combination thereof.

* * * * *

UNITED STATES PATENT AND TRADEMARK OFFICE
CERTIFICATE OF CORRECTION

PATENT NO. : 5,200,086

DATED : APRIL 6, 1993

INVENTOR(S) : JITENDRA T. SHAH, et al

It is certified that error appears in the above-identified patent and that said Letters Patent is hereby corrected as shown below:

In Claim 16, column 18, line 48 and 52, delete "  "

Signed and Sealed this

Twenty-first Day of December, 1993

Attest:

BRUCE LEHMAN

Attesting Officer     *Commissioner of Patents and Trademarks*